Aug. 14, 1934.　　　E. J. SCHNEIDER　　　1,970,397
SLICING MACHINE
Filed Dec. 20, 1930　　　7 Sheets-Sheet 1

Fig. 1.

INVENTOR
Edward J. Schneider.
By
ATTORNEY

Aug. 14, 1934.    E. J. SCHNEIDER    1,970,397
SLICING MACHINE
Filed Dec. 20, 1930    7 Sheets-Sheet 6

INVENTOR
Edward J. Schneider.

By Ralph Raevich
ATTORNEY

Patented Aug. 14, 1934

1,970,397

UNITED STATES PATENT OFFICE

1,970,397

SLICING MACHINE

Edward J. Schneider, St. Louis, Mo., assignor to Papendick, Inc., St. Louis, Mo., a corporation of Missouri Application December 20, 1930, Serial No. 503,745

28 Claims. (Cl. 146—153)

This invention relates to certain new and useful improvements in machines for the slicing of baked bread loaves and other articles and commodities.

My invention is especially directed to the efficient and economical slicing of freshly baked bread loaves or the like, as practiced in the bakery art. Bread loaves that are freshly baked are, as is well known, warm and contain a large percentage of moisture so that the bread structure is hence not readily cut by the slicing knives, but rather, its cellular tissue tends to collapse from the cutting pressure of the knives and to be mashed and rolled into a "pill" or ball of dough inside the loaf, seriously affecting the quality of the bread, if not entirely destroying the value of the loaf as a salable commodity.

Heretofore, so far as I am aware, it has been sought to avoid such "pilling" effect by limiting the rate of feed of the bread to the knives, and in acutal practice the economical rate of feed to the slicing knives has been, so far also as I am aware, about 1500 of the usual size of loaves of bread per hour, whereas, I may here state, a machine of my present invention is designed and adapted for efficiently and economically slicing such sized bread loaves at the rate approximately of 2500 loaves per hour.

It is, moreover, necessary to minimize the "whip" of the knife blades, especially when employing a high reciprocatory speed of the knives. Such whipping action of the blades not only shortens the life of the knives, but also, by laterally binding on and compressing the bread tissue, tends to initiate the "pilling" effect described, and further to interpose a serious resistance to the progress of the loaf through the slicing mechanism.

Finally, for minimizing the "whip" of the blades, and the "pilling" action of the knives on the bread structure, it is important that the feed of the loaf to and through the slicing knives be continuously uniform so as to provide, as far as possible, the same intensity of cutting pressure of the knives on the bread tissue for the duration of the slicing operation.

My invention has hence for its chief objects to provide a slicing machine adapted for accomplishing the foregoing desirable results and securing the benefits thereof in a practical, economical and efficient manner, by reciprocatorily actuating the cutting blades with a minimum amplitude of vibration, but at a very rapid rate of alternations, so as to provide a high velocity or cutting speed of the knives during the effective cutting period of their strokes, while the reversal or non-cutting periods of the strokes of the knives are of such short duration as to be of substantially negligible retarding effect on the uniform feed of the bread to the slicing mechanism, and further to provide means for tensioning the knife-blades and for uniformly and positively feeding the loaves to the slicing knives, all as will more particularly hereinafter appear.

And with the above and other objects in view, my invention resides in the novel form, construction, arrangement, and combination of parts hereinafter described and pointed out in the claims.

In the accompanying drawings (seven sheets),—

Referring now more in detail and by reference characters to the drawings, which illustrate practical embodiments of my invention the slicing machine includes, briefly, loaf-conveying means A, loaf-feeding means B, loaf-slicing means C, and a suitable coordinated driving mechanism D for actuating or operating the conveying means, the feeding means, and the slicing means in synchronism.

The main frame of the machine preferably includes a rectangular bed-frame 1 supported in the usual manner by suitable corner-legs 2. On the forward portion of the bed-frame 1, is mounted a pair of transversely spaced upstanding side-frames 3.

The conveying means A includes a floor stand 4, spaced in front of the bed-frame 1 a suitable distance from the side frame 3 for supporting therebetween a pair of transversely spaced longitudinal beams or members 5, on which is suitably disposed a flat approximately horizontal receiving table or plate 5.

Preferably the plate 6 is made the full width of the machine, overlaps at its front end the stand 4 and at its rear end the side-frames 3, and along its longitudinal center supports the upper run of an endless loaf-conveyer or loading belt 7, which, slidably traversing the plate 6 from the front to the rear thereof, is for such purposes trained around a front pulley 8 flush with the top of the plate 6.

The pulley 8 is mounted on a shaft 9 journaled in the top of the floor stand 4 and is presented in a slot 10 provided in the plate 6, the belt 7 passing upwardly through the slot 10 onto the plate 6, thence rearwardly thereover to a slot 11 provided in the rear margin of the plate 6. In the slot 11 is presented a pulley 12 flush with the top of the plate 6 and mounted on a shaft 13 journaled in and between the side frames 3. The belt 7 passes downwardly through the slot 11, under the pulley 12, and thence returns to the pulley 8.

Figure 1:
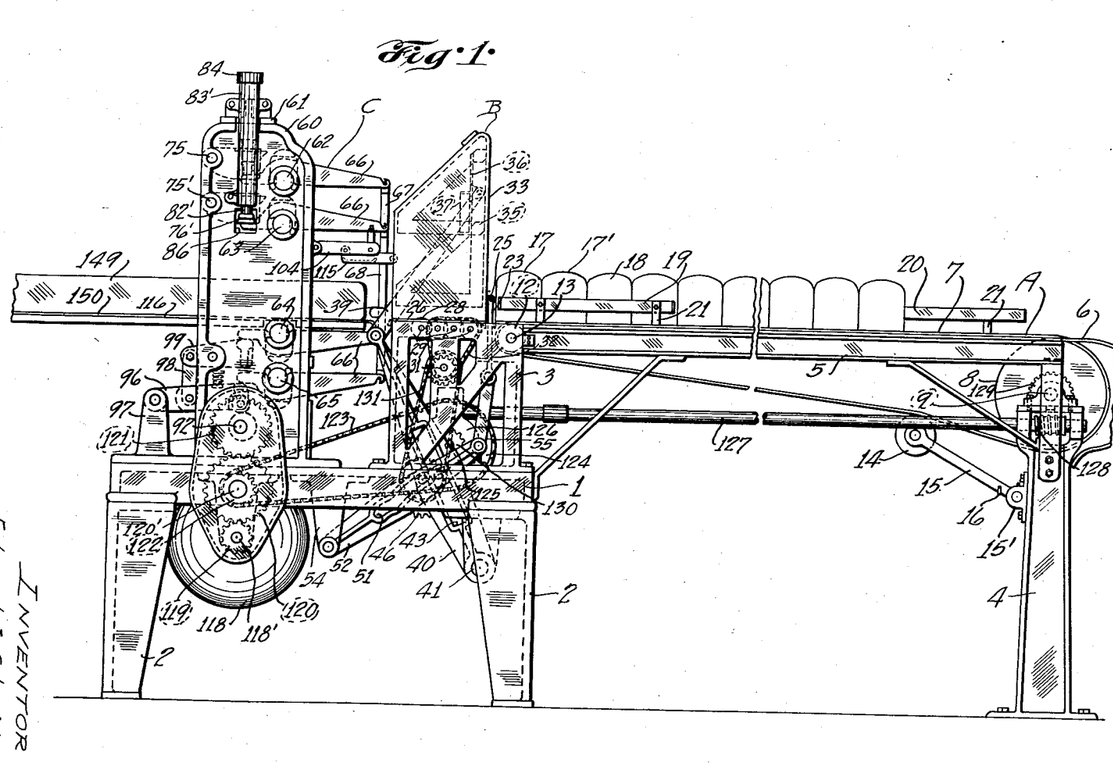
Figure 1 is a broken side elevational view of a bread-slicing machine of my invention.

The belt 7 is tensioned preferably by means of an idler pulley 14, yieldingly engaging the return run of the belt between the pulleys 12 and 8, said pulley 14 being journaled for such purpose on the free or swingable end of a tensioning arm 15 pivotally supported on a bracket 15' mounted on the floor stand 4, the arm 15 being yieldingly upwardly urged by a spring 16 engaged between the arm 15 and the bracket 15', as best seen in Figure 1.

At its front margin, the plate 6 is curved downwardly, more or less, over the pulley 8 for facilitating the deposit of loaves of bread 17, 17', and 18, as will soon more particularly appear, on the belt 7, said loaves during transportation by the belt 7 over the rear portion of the plate 6 being, for suitable guidance therealong, oppositely endwise engaged by respective guide-bars 19, 20, preferably laterally shiftably supported on the plate 6 suitably along the opposite sides of the belt 7 to adjustably accommodate for slicing various sizes of loaves, the bars 19, 20, being supported in elevated position above the plate 6 by means of lugs 21 secured in adjusted position preferably by headed bolts 21' upstanding through respective transverse slots 22 provided in the plate 6.

Figure 2:
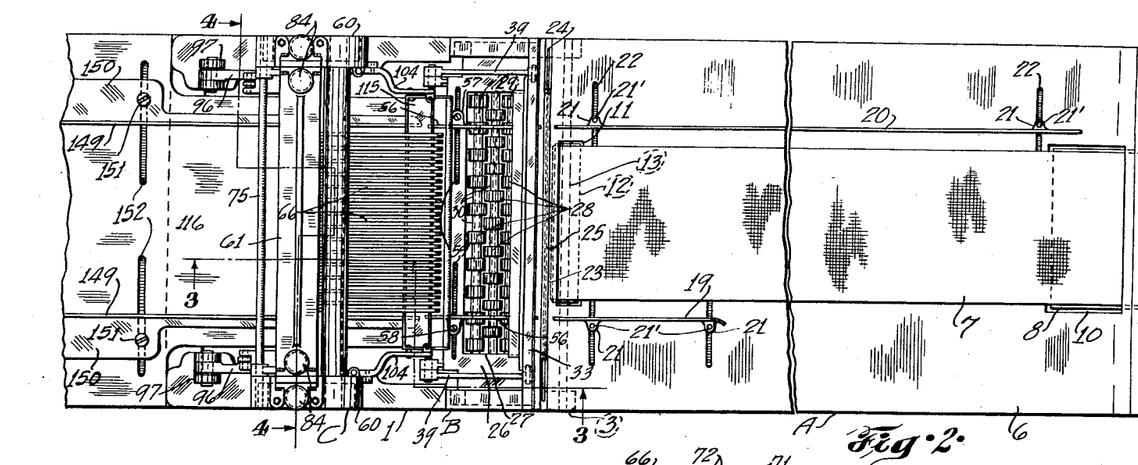
Figure 2 is a plan view of the machine, the extreme rear end portion being broken away.

One bar, 20, as best seen in Figure 2, extends substantially forwardly beyond the bar 19, providing a backing wall against which the deposited loaves may most conveniently aligningly abut as the loaves of bread so deposited are transported by the belt 7 to the rear of the plate 6.

The feeding means B includes a vertically reciprocable stop or feed-gate 23 slidable in vertical grooves 24 provided in the opposing faces of the adjacent side frames 3, in a plane just in the rear of the pulley 12. Said gate 23 alternately takes a position in and out of the movement of the loaves of bread leaving the belt 7, such that, when the gate 23 is up, it is impinged by the leading loaf, as 16, on the belt 7, and, hence, movement of the loaf 17 and its following loaves, as 17', 18, is arrested, the several loaves being crowded into abutting relation on the belt 7, the latter, of course, frictionally sliding under its carried loaves when the gate is in loaf-arresting position.

Such frictional engagement of the belt 7 and the arrested loaves forces the first loaf 16 against the gate 23, and to avoid and eliminate the possibility of damage to the loaf on movement of the gate 23, preferably a roller 25 is mounted for rotation on and between suitable opposing brackets 25' upstanding from the upper margin of the gate 23, the roller 25 rollably engaging the impinging face of the arrested loaf 17 as the gate 23 is lowered for admitting said loaf 16 therepast.

The gate 23, being intermittently shiftable, as presently appearing, for alternately arresting and releasing the loaves of bread fed on the conveyer 7, thus periodically permits the successive loaves, one at a time, to be fed onto a loaf-receptive feed-plate 26, the latter being mounted on and between the side frames 3 in position to receive the loaves of bread deposited thereon from the belt 7. Additionally, however, means are provided for moving the released loaf longitudinally from the belt 7 and over the feed plate 26 to permit the gate 23 to close against any following loaves on the belt, as now appearing.

Peripherally presented through a transverse aperture 27 provided in this plate 26 rearwardly of the gate 23, is a plurality or a so-called bed of rollers 28 arranged in four interfitting groups each axially parallel and mounted on one of alternate pairs of shafts 29 journalled in and between the side frames 3 below the plate 26. By means of spacers 30, the rollers 28 on the respective shafts 29 are disposed in staggered relation, thereby forming a so-called roll-conveyer for peripherally engaging a loaf of bread advancing past the lowered gate 23.

The respective shafts 29 are driven in unison by a counter-shaft 31 journalled therebelow in and between the side frames 3, the shafts 29 being operatively connected to the shaft 31 by respective chain-drives 32. The shaft 31 is driven from other moving parts of the machine, as will soon appear, but it may be here stated that the rollers 28 have a peripheral speed greater than the linear velocity of the belt 7, such that, when the gate 23 is dropped or lowered, the loaf, as 16, first advancing from the belt 7 will be engaged by the rollers 28 and thereby pulled away from the belt 7 at a greater speed of travel than, and thus spaced from, the following loaves, as 17, 18, advancing on the belt 7 towards the gate 23, the latter, as soon as the loaf 16 is clear thereof, rising into the space between the loaves 16, 17, to again arrest the progress of the loaves on the belt 7.

The feeding mechanism B also includes a pair of opposing vertical cam-plates 33 upstanding from each side frame 3, the opposing faces of the plates 33 each having a pair of triangular upper and lower cam-grooves 34, 34', respectively. The cam-grooves 34, 34', preferably include respective vertical down-legs $a$, $a'$, rearward horizontal legs $b$, $b'$, and upward and forwardly inclined or rising legs $c$, $c'$. The legs $a$, $a'$, are aligned and conjoined, and the upper end of the leg $c'$ of the cam $34'$ is preferably conjoined to the front end of the leg $b$ of the cam groove 34 at its junction with the legs $a$, $a'$, all as best seen in Figure 3.

Figure 3:
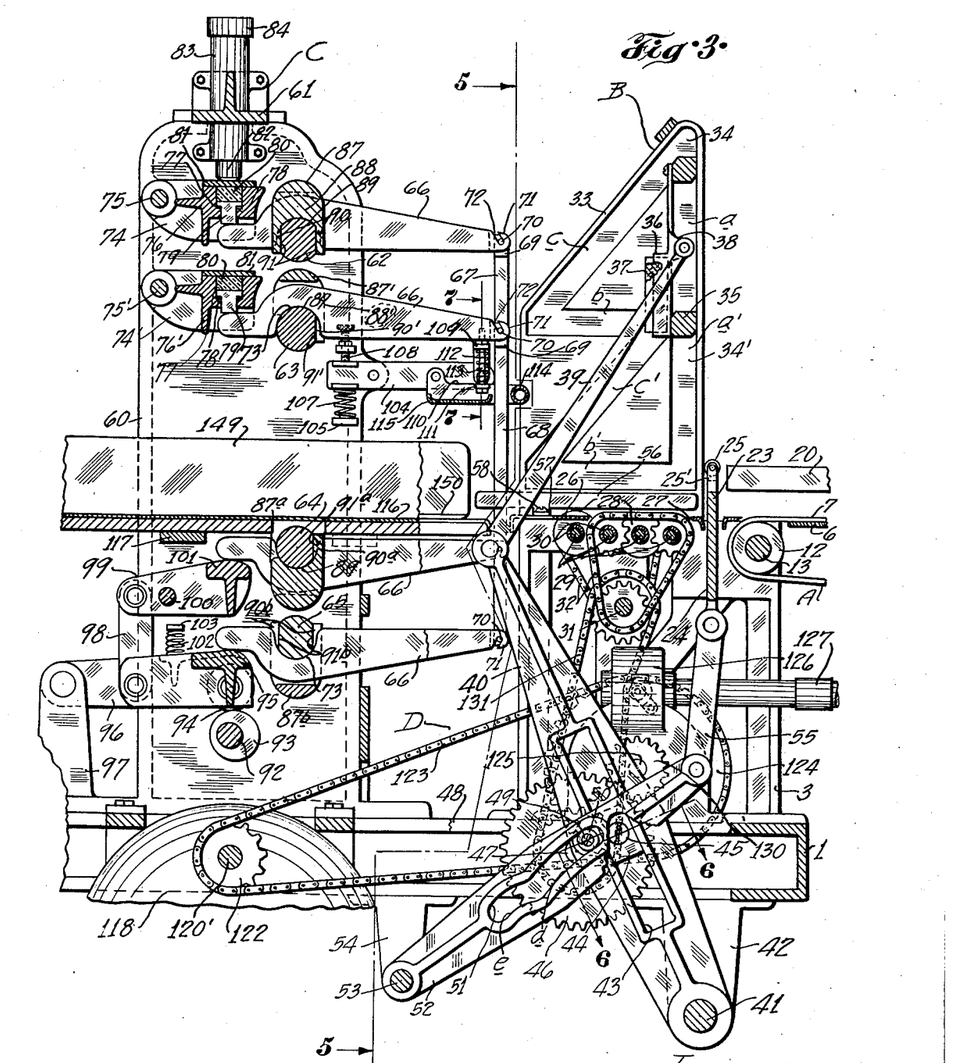
Figure 3 is an enlarged sectional view of the slicing and feeding mechanisms of the machine, taken approximately along the line 3, 3, Figure 2.

The pairs of cam-grooves 34, $34'$, are horizontally in registration and are each slidably engaged by the opposite ends of respective vertically spaced horizontal follower-bars 35, the latter being preferably of a generally square cross-section for working in the legs $a$, $a'$ and $b$, $b'$, of the cam-grooves as also seen in Figure 3. However, as the bars 35 do not revolve in traversing the cam-grooves, the diagonal corners of each bar 35 are also preferably chamfered suitably for working in the inclined legs $c$, $c'$, as best seen in Figure 3.

The bars 35 are connected by a push-plate or feeding member 36 provided with a rearwardly presented longitudinal or horizontal pocket $36'$, in which is fitted a preferably wood block 37 forming a pad for engaging a loaf of bread disposed therebefore for periodic feeding actuation of the loaf to the slicing mechanism C of the machine, as shortly appearing. The block 37 is preferably for such purpose provided with a transverse series of vertical knife-edge-receptive channels or grooves forming intervening tongues $37'$, which are adapted, during the feeding movement of the block 37, to interfit with the knives of the slicing mechanism as the loaf is fed therethrough.

The opposite ends of the push-plate 36 carry bosses 38, to which are pivotally connected the respective upper ends of a pair of links 39 extending in a generally rearward and downward oblique direction. At their lower ends the links 39 are pivotally connected to the respective upper ends of a pair of oscillatory feeder operating levers 40, $40'$, extending, in turn, angularly to the links 39, preferably in a generally downward and forward oblique direction.

Figure 5:
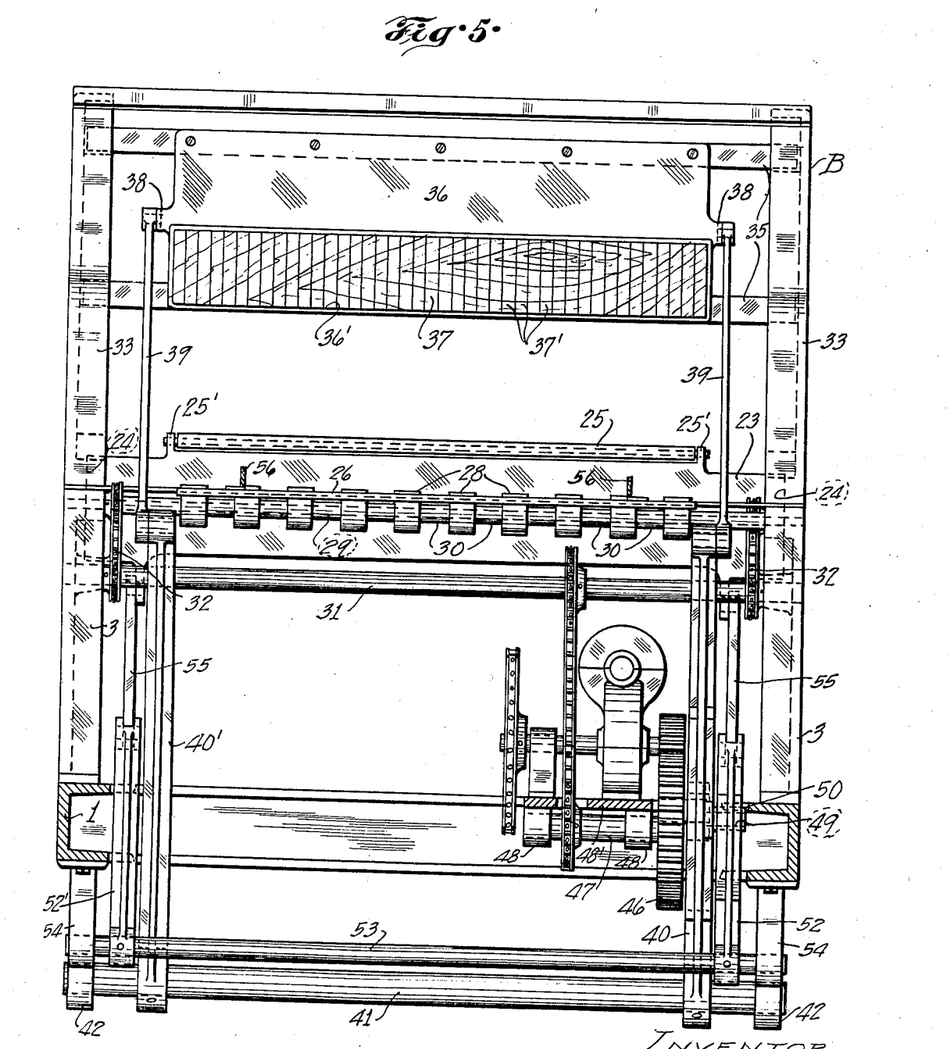
Figure 5 is a sectional view of the feeding mechanism, taken approximately along the line 5—5, Figure 3.

At their lower ends, the levers 40, $40'$, are respectively fixed on the opposite ends of a transverse shaft 41 journalled in and between brackets 42, respectively depending from the opposite sides of the bed-frame 1. One lever, 40, is provided with an intermediate longitudinal slot 43, in which for reciprocative purposes is mounted the slide-block or cross-head 44 of a crank-pin 45, the latter being circularly actuated by, and preferably mounted on, a suitable crank-gear 46, which is mounted on a jack-shaft 47 journalled in suitable bearings 48 carried by a longitudinal member $48'$ of the bed-frame 1, as best seen in Figures 3, 5, and 6.

It will, however, be seen that rotation of the gear 46 revolves the crank-pin 45 for oscillating the lever, 40, which movement is transmitted, in turn, to its paired lever $40'$, by means of the shaft 41.

Figure 6:
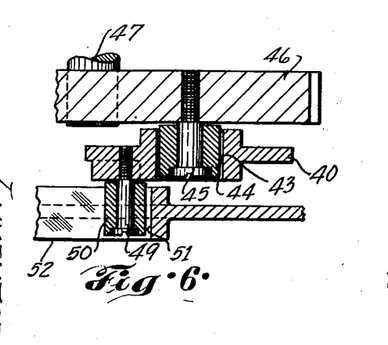
Figure 6 is a fragmentary sectional view taken approximately along the line 6—6, Figure 3, showing the driving connection between the oscillatory feeder operating lever and the gate operating lever, other parts being broken away.
Figure 7:
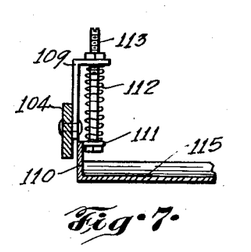
Figure 7 is a fragmentary sectional view taken approximately along the line 7—7, Figure 3, showing the yieldable connection between the presser arm and its supporting lever.

The lever 40 carries a stud 49, Figure 6, on which is journalled a roller 50 for working in a suitable cam-slot 51 provided longitudinally in one, as 52, of a pair of gate operating levers 52, $52'$, which extend in a rearward and downward direction, more or less, at right angles to the levers 40, $40'$ and are respectively mounted on the opposite ends of a transverse shaft 53 journalled in and between brackets 54 depending from the bed-frame 1 rearwardly of the brackets 42. Each lever 52, $52'$, is connected by a link 55 to the respective opposite ends of the gate 23, the levers 52, $52'$, being adapted for vibration or actuation by, and in proper synchronism during a predetermined portion of the movement of, the levers 40, $40'$, for raising and lowering the gate 23. For such purpose, the cam slot 51 is formed with a forward portion $d$ concentric with the axis of the shaft 41, and with a rearward portion $e$ eccentric to said axis, such that the lever 52 is elevated for raising the gate 23 while the roller 50 engages the portion $d$, and depressed for lowering the gate 23 as the roller 50 enters the portion $e$, such latter movement of the levers 52, $52'$, occurring as the lever 40 approaches the end of its rearward movement or feed-stroke, and I might add that preferably the crank-pin 45 is revolved upwardly and rearwardly, that is, in a counter-clockwise direction when viewed as in Figure 3, for providing a slow feed stroke and a quick return stroke to the push-plate 36. To this end, the several parts are so relatively arranged that, when the levers 40, $40'$, are in their extreme forward position, the push-plate 36 is in its extreme upper or forward elevated position above the feed-plate 26, the crank-pin 45 being then at its forward dead-center and the gate 23 raised.

Assuming that the first loaf of bread 17 has previously been admitted past the gate 23, such loaf will have been transported by the rollers 28 sufficiently to space the loaf 16 from the gate 23. As the crank-pin 45 passes its forward dead-center, the levers 40, $40'$, are caused to swing rearwardly, pulling the push-plate 36 in a path defined by the cam-grooves 34, $34'$, such that, as the bars 35 respectively engage the grooves $a$, $a'$, the push-plate 36 is lowered toward and to a point just above the feed-plate 26, and as the bars 35 respectively engage the grooves $b$, $b'$, the push-plate 36 is then caused to move horizontally rearwardly along the feed plate 26 for engaging the loaf 16 and feeding the same to and through the slicing mechanism C of the machine.

During the feeding of the bread loaf 17, the same is endwise engaged by a pair of adjustably laterally spaced longitudinal walls 56 having lugs 57, which, resting on the plate 26, are thereupon secured in adjusted position by headed bolts 58, upstanding from respective transverse slots 59 provided in the plate 26.

When the roller 50 engages the portion $e$ of the cam-slot 51, the lever 52 is depressed, correspondingly lowering the gate 23 for admitting the next loaf, as $17'$, therepast, such lowering movement being reversed as the crank-pin 45 passes its rear dead center and the push-plate 36 completes its feed-stroke. Thereupon the lever 40 is caused to swing forwardly, the lever 52 is swung upwardly for closing the gate 23 against the loaf 18, and the push-plate 36 is moved upwardly and forwardly, the bars 35 engaging the respective grooves $c$, $c'$, and thus guiding the push-plate 36 in a diagonal path away from the feed plate 26 to the elevated forward position thereof for repetition of its feeding cycle, at this time, the gate 23 being lowered, another loaf, $17'$, is admitted past the gate 23, said loaf $17'$ then being engaged by the bed of rollers 28 and transported under the rising push-plate 36 for placing said loaf in the horizontal path of the feeding member 36.

The push-plate 36 hence periodically traverses the feed plate 26 for feeding successive loaves of bread to be sliced, to and through the slicing mechanism C of the machine, now to be described.

Figure 4:
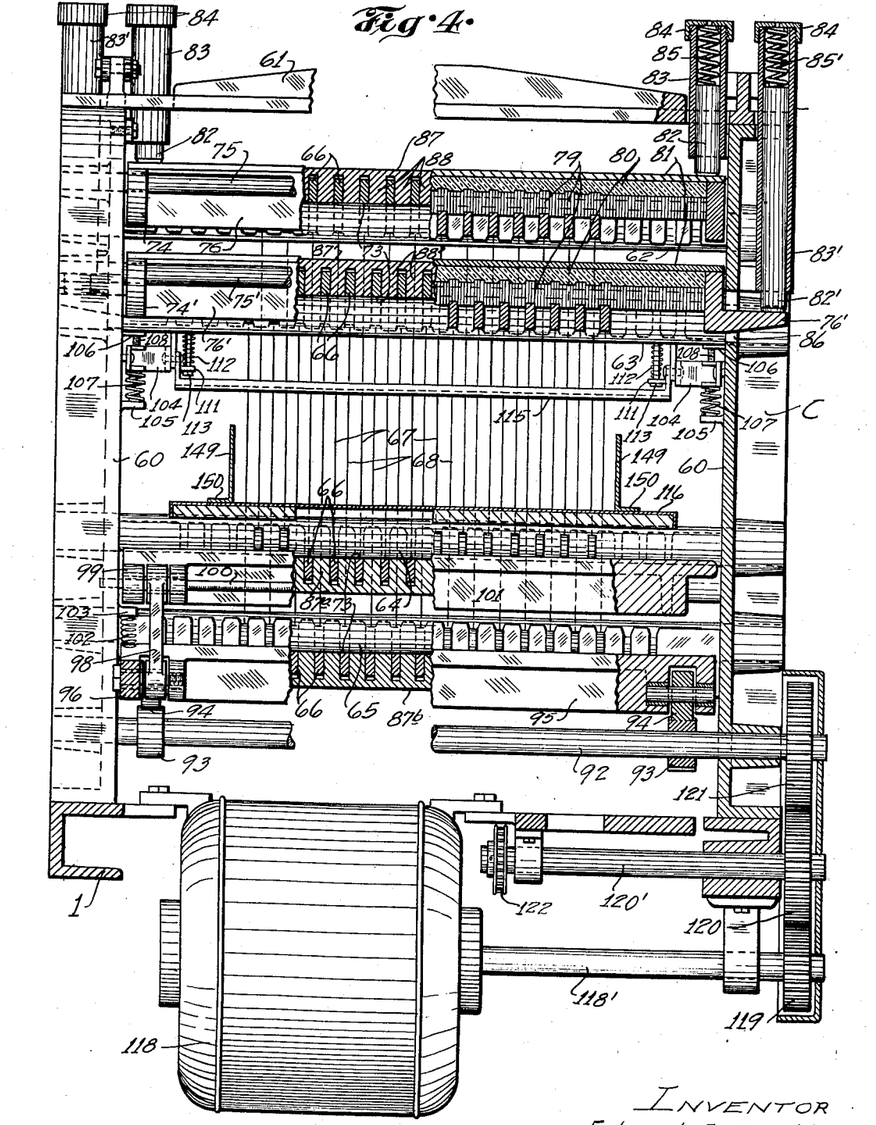
Figure 4 is an enlarged sectional view of the slicing mechanism of the machine, taken approximately along the line 4, 4, Figure 2.

The slicing mechanism C includes preferably a pair of transversely spaced upstanding standards 60 respectively disposed on opposite sides of the bed-frame 1 and rigidly tied together at their tops by a suitable brace 61, as best seen in Figure 4.

Journalled in and between the standards 60, are four vertically aligned horizontal rock shafts 62, 63, 64, 65. The shaft 62 is spaced above the shaft 63, and the latter is suitably spaced above the level of the feed plate 26. The shaft 64 is located below the plane of the feed-plate 26 and the shaft 65 is spaced below the shaft 64.

The shafts 62, 63, 64 and 65 are the respective fulcrums for four corresponding groups of rockingly shiftable oscillatory knife-supporting levers 66, each comprising a relatively long swingable knife carrying arm presented, in each instance, forwardly of the shafts 62, 63, 64 and 65, and a relatively short arm presented rearwardly, respectively, of said shafts, for a purpose soon appearing.

The levers 66 on the uppermost shaft 62 are transversely spaced therealong and each is vertically aligned and paired with a lever 66 on the third shaft 64, between which levers on the shafts 62, 64, is supported a plurality of knives or cutting elements 67. The levers 66 on the second shaft 63 are likewise transversely spaced therealong so as to interfit between the knives 67, and each is vertically aligned and paired with a lever 66 on the fourth shaft 65, between which levers on the shafts 63, 65, is also supported a cutting element or knife 68. The knives 67, 68, are thus disposed in transverse banks adjacent to the rear margin of the feed plate 26 and arranged in laterally spaced pairs, the space between each pair of knives 67, 68 defining the thickness of the slice to be cut, the knives of each pair being reciprocatory in opposite directions, as will soon appear.

In my copending application for patent for Cutting element or knife, field May 31, 1930, Serial Number 457,682, to which reference is hereby made, I fully describe an improved form of knife such as I prefer to employ in the present machine. Suffice it to here state that the blade of the knife is suitably reinforced at its opposite ends with a pad 69, and secured through each pad 69 is a stud 70 having its ends laterally presented from each side of the blade.

Figures 8, 9:
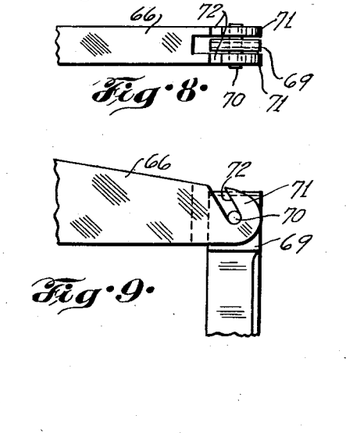
Figure 8 is a fragmentary plan view of a knife-carrying lever and an end of its supported knife.
Figure 9 is a fragmentary side elevational view of the knife-carrying lever, Figure 8.

The knife-carrying arm of each lever 66 terminates in a pair of spaced ears 71 suitably preferably obliquely slotted, as at 72, for reception of the stud 70 of an end of a knife 67 or 68 inserted in the yoke provided by and between the ears 71, as best seen in Figures 8 and 9.

The levers 66 on the lower shafts 64, 65 are the driving or actuating levers, and are inverted with respect to the levers 66 on the upper shafts 62, 63, which latter levers are the tensioning levers, the same being rockingly shiftable on their shafts, 62, 63, in order that the knives 67, 68, may be stretched or tensioned between their respective pairs of supporting levers. The respective groups of knives 67, 68, are automatically tensioned and actuated as a group, and each of the knives 67, 68, is likewise automatically individually tensioned to compensate for variations in the lengths of the individual knives and also in the manufacture of the levers and other parts of the slicing mechanism. For the latter purpose, the levers 66 are loosely fulcrumed on their respective supporting shafts, that is to say, the levers 66 may adjustably rotate on, as well as rotate in groups with, the respective shafts 62, 63, 64, 65. While it would suffice to journal each lever on its respective shaft, I prefer, for facilitating the assemby of the machine, to provide each lever 66 with an arcuate notch or seat 73, complementary to the particular shaft engaged by the lever, so that any lever of a group may be seated on its shaft without disturbing the others.

The upper groups of levers 66 bear on the top of the respective shafts 62, 63, while the lower groups of levers 66 bear on the bottom of the respective shafts 64, 65, as best seen in Figure 3, for the reason that the upper levers 66 tensionally oppose and yield to movement of the lower levers 66, which latter are actuated in a positive manner, as will soon appear.

Having at its opposite ends arms 74 mounted on a shaft 75 journalled in and between the standards 60, is a transverse tensioning bar 76 provided with a longitudinal slot 77 cross-sectionally shouldered, as at 78. Depending through the slot 77 and normally supported on the shoulders 78, is a plurality of adjoining T-shaped plungers 79, preferably formed of relatively thin-metal stampings or the like.

A strip of rubber or like resilient or elastic material 80 is compressed in the slot 77 between the top of the bed of plungers 79 and a cover plate 81 suitably secured on the bar 76. The plungers 79 are thus protruded below the bar 76 each under an individual initial tension for opposing the thrust of the respective rearward arms of the group of levers 66 on the shaft 62, said levers extending under the bar 76 for liftingly impinging upon such of the plungers 79 as may be immediately thereabove. While, of course, all the plungers 79, may not be thus engaged, the construction described obviates the necessity of exact adjustment and considerably cheapens the cost of manufacture of the several parts of the device.

The initial tension of the plungers 79 corresponds to or is greater than the minimum desired tension of the knives 67. Hence, when the bar 76 is caused to bear upon the levers 66 as a group, the lever carrying the longest knife will, for example, bear on its engaged plunger 79 with minimum pressure, while the other levers 66 will press their respectively engaged plungers 79 more or less into the resilient material 80 according to the lengths of the respective knives carried by said levers 66. However, as the knives 67, reciprocate during the slicing operation, it is necessary to permit oscillation of the levers 66, while maintaining a suitable tension on the knives 67, as a group. For such purpose, the bar 76 is yieldingly engaged at its opposite ends by respective plungers 82, each working in a cylinder 83 supported on the inside of the adjacent standard 60 and closed at its top by a screw-cap 84, between which and the upper end of the plunger 82 is engaged a compression spring 85, Figure 4.

The means for tensioning the group of knives 68 supported on the shaft 63 is substantially similar to the means set forth for tensioning the knives 67, and includes a tensioning bar 76' mounted by means of arms 74' on a shaft 75' journalled in and between the standards 60 below the shaft 75. The bar 76' is also provided with a slot bar 77, shouldered, as at 78, and carries therein a plurality of the plungers 79, between which and the cover plate 81 is the resilient material 80, and the plungers 79 are likewise engaged by the rear arms of the levers 66 mounted on the shaft 63, by means of which the knives 68 are tensioned in a manner and for a purpose substantially similar to that set forth heretofore for tensioning the knives 67. For structural reasons, however, the bar 76 has at its opposite ends endwise presented arms 76' each respectively extended through an aperture 86 provided for the purpose in the adjacent standards 60, and each yieldingly engaged by a plunger 82' working in a cylinder 83' supported on the outside of the adjacent standard 60, and closed at its top by a screw-cap 84, between which and the upper end of the plunger 82' is engaged a compression spring 85, as also best seen in Figure 4.

It will be seen that, when mounting the knives 67, 68, in the machine, each of the levers 66 initially rocks on the shaft 62 or 63, as the case may be, for adjustably accommodating the length of its carried knife 67 or 68, but when the knives 67, 68 are actuated for slicing purposes, the shafts 62 and 63 rock with their carried levers 66, thus confining the frictional losses to those obtaining at the journals of the shafts.

The levers 66 on the shaft 62 are spaced by means of a spacing bar 87 suitably supported on the frames 60, the bar 87 having a plurality of depending spacing elements 88 each interfitted between a pair of the levers 66.

Each element 88 is provided with a seat 89 complementary to and engaging the shaft 62, each side of the seat being extended to provide a pair of spaced depending legs 90 which straddle the shaft 62 and engage flat surfaces 91 correspondingly provided on the front and rear sides of the shaft.

The levers 66 on the shaft 63 are spaced by means of a spacing bar 87' also suitably supported on the frames 60 and having a plurality of depending spacing elements 88' each interfitted between a pair of the levers 66. Each element 88' is provided with a seat 89 complementary to and engaging the shaft 63, the forward or knife side of the seat being extended to provide a depending leg 90' which engages a corresponding flat surface 91' provided on the front side of the shaft 63.

The levers 66 on the shaft 64 are similarly spaced by an inverted spacer bar 87a likewise suitably supported on the frames 60, the shaft 64 having a flat surface 91a for accommodating the legs 90a of the spacer bar 87a, and the levers 66 on the shaft 65 are likewise spaced by an inverted similarly supported spacer bar 87b the shaft 65 having front and rear flat surfaces 91b for accommodating the legs 90b of the spacer bar 87b.

The series of spacing bars 87, 87', 87a, and 87b, respectively, abut at their opposite ends the adjacent standards 60, thus providing for proper alignment of the knives 67, 68.

An actuating shaft 92 is journalled in and between the standard 60 near the base thereof, and carries, respectively mounted adjacent its opposite ends, a pair of cams 93, adapted for actuating respective rollers 94 journalled in the opposite ends of a transversely disposed lower actuating bar 95, which, as shown, upwardly operatively impinges the series of respective rearwardly presented arms of the levers 66 mounted on the lower shaft 65.

Arms 96 rearwardly presented from each end of the bar 95, are pivotally supported on respective brackets 97 upstanding from the rear corners of the frame 1 and are intermediately pivotally connected by links 98 to the rear ends of respective arms 99, intermediately rockably mounted on a shaft 100 journalled in and between the standards 60. At their forward end, said arms 99 support a transverse actuating bar 101 adapted for upwardly operatively impinging the series of respective rearwardly presented arms of the levers 66 mounted on the shaft 64.

The respective bars 76, 76' yieldingly tension the knives 67, 68, the tension in the knives being positively opposed by the respective actuating bars 101 and 95. On rotation of the shaft 92 from the position shown in Figure 3, the rising portions of the cams 93 lift the bar 95 for downward movement of the knives 68 against the tension of the springs 85. The links 98 transmit the corresponding lifting movement of the arms 96 to the arms 99, causing the latter to rock on the shaft 100 and depress the bar 101, the levers 66 following the bar 101 by reason of the tension of the springs 85' and causing the knives 67 to move upwardly or oppositely to the movement of the knives 68. When the rollers 94 engage the falling portions of the cams 93, the bar 95 is caused to follow downwardly by reason of the tension in the springs 85, causing the knives 68 to move upwardly, and the falling movement of the bar 95 being reversely transmitted to the bar 101, the latter moves upwardly, causing the knives 67 to move downwardly. The system being otherwise balanced, the force for upward movement of the bar 101 is furnished springs 102 engaged between each arm 96 and a bracket 103 on the adjacent standard 60.

Thus rotation of the shaft 92 causes the knives 67, 68 to be vibrated or reciprocated respectively in opposite directions in short, rapid strokes for slicing a loaf of bread fed to and through the knives from the feed table 26.

For holding the loaf being sliced against displacement, I provide presser-means including a pair of presser-levers 104 each pivoted intermediate its length on an adjacent one of the standards 60, and extending towards the knives 67, 68. The rear arm of each lever 104 oscillates between a pair of spaced lugs 105, 106 on the standard 60, and is pressed upwardly by a spring 107 seated between the lever and the lug 105 for urging the other end of the lever 104 downwardly. A stop or screw 108, adjustably threaded through the lug 106 opposes the spring 107 for limiting the oscillation of the lever 104.

The forward arm of each lever 104 carries an inturned lug or bracket 109, and intermediate the lug 109 and the pivot point of the lever 104, the latter swingably supports a forwardly presented presser-arm 110, extending from a point in the rear, to a point forwardly and outside, of the bank of knives 67, 68.

Below the bracket 109, the arm 110 has an inturned lug 111, and, bearing with its opposite ends of the lugs 109, 111, is a spring 112 for normally urging the same apart. A bolt 113, passed through the coils of the spring 112 and through suitable apertures in the lugs 109, 111, adjustably limits the swing of the arm 110 away from the lever 104. Disposed transversely in front of the bank of knives 67, 68, is a tubular presser-bar or member 114 whose opposite ends are supported by the respective arms 110, and disposed transversely in the rear of the knives is a horizontal presser-plate 115 having its front and rear margins upturned and its opposite ends also supported by the respective arms 110, the plate 115 being approximately aligned with the bottom of the member 114. By manipulating the screw 106 and the bolt 113, the bar 114 and plate 115 may be yieldingly disposed parallel with the feed plate 26 at a desired height thereabove suitably to press upon and accommodate a loaf of bread which, sliding therebetween, is first engaged between the bar 114 and the feed plate 26 as the loaf is fed to the knives 67, 68, and then, as the loaf is fed through the knives, the resulting sliced loaf is engaged between the plate 115 and a horizontal delivery table 116 disposed therebelow approximately at the level of the feed plate 26, the bar 114 and plate 115 rockingly yielding to said loaf movement for opposing the loaf displacing effect of the reciprocating knives 67, 68. The front margin of the delivery table 116 is disposed transversely in the use of the banks of knives 67, 68, and extends rearwardly as far as may be desired from and between the standards 60, on which the table 116 is supported by suitable lugs 117 provided on said standards 60.

The operating mechanism D preferably includes a suitable prime mover or motor 118 supported beneath the bed-frame 1, whose shaft 118' is journalled suitably in the frame 1 and carries a pinion 119 meshing with an idler gear 120, the latter, in turn, meshing with a gear 121 mounted on the shaft 92 for actuating the knives 67, 68. The gear 120 is mounted on a jack-shaft 120' journalled in the frame 1, said shaft carrying a sprocket 122, which, by means of a chain 123, drives a sprocket 124 mounted on a countershaft 125 suitably journalled on the bed-frame 1, the shaft 125, by means of a suitable transmission device 126, driving a longitudinal shaft 127 extending to, and journalled in the floor-stand 4, and which, by means of a worm 128, drives a gear 129 on the shaft 9 for actuating the conveyer belt 7.

The shaft 125 also carries a pinion 130 meshing with the gear 46 for actuating the gate 23 and push-plate 36.

The shaft 47, driven by the gear 46, actuates, by means of a suitable chain-and-sprocket arrangement 131, the shaft 31 for operation of the bed of rollers 28.

Figure 10:
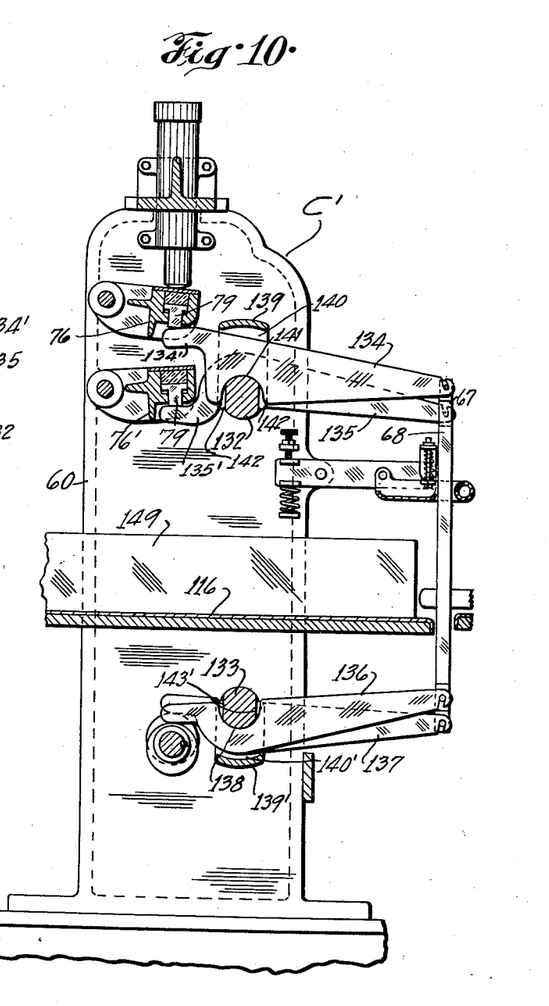
Figure 10 is a fragmentary sectional view of a modified form of slicing mechanism of my invention.
Figure 11:
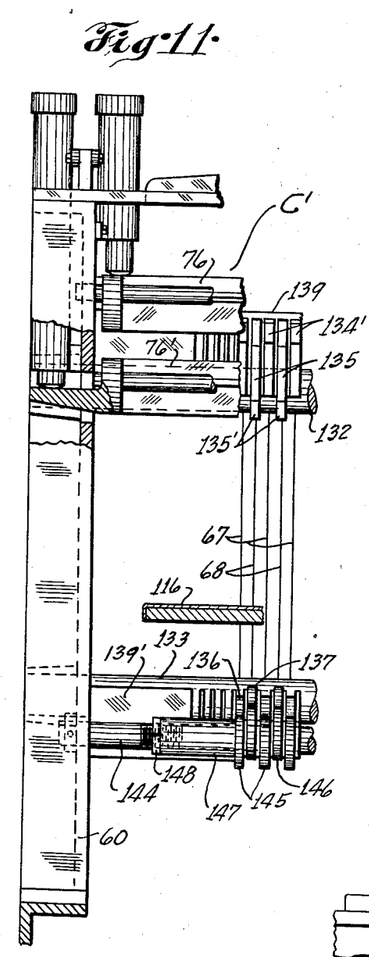
Figure 11 is a fragmentary approximately half rear view of the mechanism of Figure 10, parts thereof being shown in section and other parts being broken away.

In the modified form C' of slicing mechanism, shown in Figures 10 and 11, a pair of transverse rock-shafts 132, 133, is journalled in and between the standards 60, the shaft 132 being disposed a suitable distance above the delivery table 116 and the shaft 133 a suitable distance therebelow. Alternately spaced along and respectively fulcrumed on the shaft 132, are knife carrying levers 134, 135, the respective levers being vertically aligned and paired with respective levers 136 fulcrumed on the shaft 133. The respective levers 135 are likewise vertically aligned and paired with respective levers 137, fulcrumed on the shaft 133, the levers 137 alternating with the levers 136 on said shaft 133.

The knife-carrying arms of the respective pairs of levers 134, 136, and 135, 137, support knives 67, 68, respectively substantially as heretofore set forth, and each of said levers is provided with an arcuate seat 138 by means of which it is loosely fulcrumed on its respective rock shaft 132 or 133. The levers 134 each have a rearward arm 134' adapted to project between the tensioning bars 76, 76' for engaging the plungers 79 in the bar 76, substantially in the manner heretofore set forth for tensioning the knives 67. The levers 135 likewise each have a rearward arm 135' adapted to project below the bar 76' for engaging the plungers 79 therein, also substantially in the manner heretofore set forth for tensioning the knives 68.

The levers 134, 135, are spaced on the shaft 132 by means of a spacing bar 139 having a plurality of depending spacing elements 140 each interfitted between a pair of levers 134, 135. Each element 140 is provided with a seat 141 complementary to, and engaging the shaft 132, each side of the seat being extended to provide a pair of spaced depending legs 142, which straddle the shaft 132 and engage flat surfaces 143 correspondingly provided on the front and rear sides of the shaft. The levers 136, 137, are spaced on the shaft 133 by means of a spacing bar 139' having a plurality of upstanding spacing elements 140' each interfitted between a pair of the levers 136, 137. Each element 140' is provided with a seat complementary to and engaging the shaft 133, each side of the seat being extended to provide a pair of upstanding legs 142, which straddle the shaft 133 and engage flat surfaces 143' correspondingly provided on the front and rear sides of the shaft. The series of spacing bars 139 and 139' respectively abut their opposite ends with the adjacent standards 60, thus providing for proper alignment of the knives 67, 68.

An actuating shaft 144 is journalled in and between the standards 60 near the base thereof. Keyed on the shaft 144, is a plurality of oppositely disposed cams 145, 146, the cams 145 being respectively disposed mounted under the rear arms of the respective levers 136, for operative engagement therewith, and the cams 146 alternating with the cams 145 for operative engagement with the rear arms of the levers 137. At each end of the group of cams 145, 146, is an abutting sleeve 147 slidable on the shaft 144 and endwise engaged by a nut 148 threaded to said shaft for longitudinal adjustment of the cams 145, 146, therealong.

The initial tension in the knives 67, 68, is opposed by the engagement of the levers 136, 137, with the cams 145, 146, respectively, and on rotation of the shaft 144, the knives 67, 68, are oppositely reciprocated for slicing purposes by means of said cams 145, 146, the shaft 144 being actuated, as will be understood, by means similar to that heretofore set forth for actuating the shaft 92.

I might add that the delivery table 116 is provided with a pair of adjustably laterally spaced longitudinal walls 149 each having an outstanding flange 150 resting on and secured to the table 116 by means of suitable headed bolts 151 upstanding from respective transverse slots 152 provided in the table 116.

Figure 12:
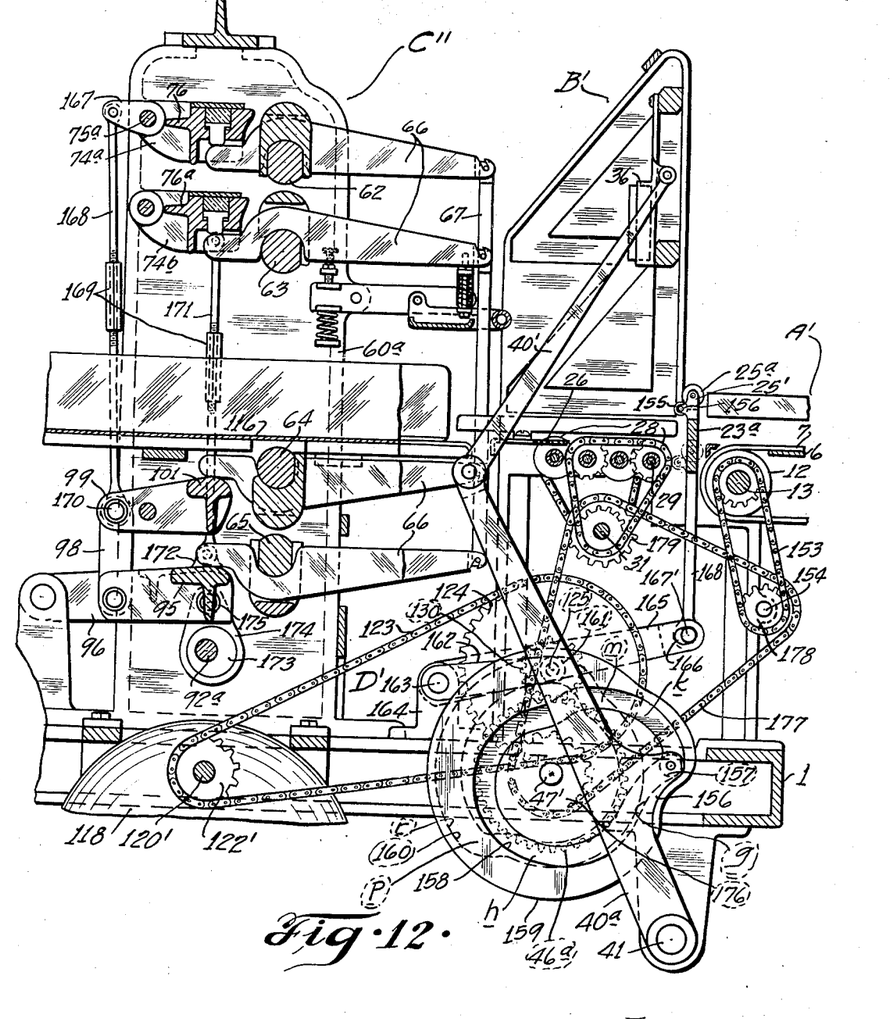
Figure 12 is a view, similar to Figure 3, of a modified form of feeding mechanism and a second modified form of slicing mechanism of my invention.

In Figure 12, is shown a modified form of slicing machine embodying my invention, this type of the machine including a loaf-conveyer A', feeding mechanism B', slicing means C'', and coordinated operating means D'.

In the modified form of conveyer means A', the conveyer belt 7 is driven from the head pulley-shaft 13, the latter having a chain and sprocket driving-connection 153 with a countershaft 154 suitably journalled on and between the side frames 3 of the machine. The shaft 154 is actuated by the operating mechanism D', as soon appearing, but I may here state that in the conveyer A' the tail-shaft thereof, not shown in Figure 12, has no driving connection with the mechanism D'. In other respects, however, the conveyer A' is in form, construction and functions, similar to the conveyer A before described, and hence, to avoid repetition, further description thereof is hereto omitted.

In the modified form of feeding mechanism B' shown in Figure 12, the gate 23a is provided with an additional longitudinal roller 155 journailed in and between opposing brackets 156 rearwardly projected from the gate 23a near its upper margin thereof and preferably adjacent the brackets 25'. The roller 155 frictionally peripherally engages the roller 25a and is adapted, when the gate 23a is lowered, for likewise frictionally engaging one or more of the rollers 28 on the forward or adjacent one of the shafts 29. Hence, on lowering the gate 23a, its carried roller 25a is rotarily actuated by means of the rollers 28 on the said shaft 29 through the intermediary of the idler roller 155. The roller 25a hence, when so rotarily actuated, supplements the action of the bed of rollers 28 for peripherally engaging the loaf of bread advancing past the lowered gate 23a for rapidly spacing said bread loaf from its following companions on the belt 7, thus assuring that the loaf will not accidently "hang-up" on the gate 23a. In other respects of form and functions, however, the gate 23a is similar to the gate 23 except for its connection with the driving mechanism D', as will later appear.

In the feeding mechanism B', also, the means for oscillating feeder operating lever 40a is a simple lever having near its fulcrumed end a forwardly projected arm 156, on which is rotarily mounted a roller 157. The roller 157 works in a cam-groove 158 of a disc or face-cam 159, the latter being mounted on the shaft 47' disposed for rotation on the frame 1 of the machine similarly to the shaft 47. The cam-groove 158 includes a rapidly falling portion g for bringing the push-plate 36 in lowered position for engaging a loaf of bread on the feed plate 26 a more slowly falling portion h for actuating the push-plate 36 in loaf-feeding direction rearwardly along the plate 26, and a rising portion k for returning the push-plate 36 to elevated position after completion of its feeding stroke, in readiness for repetition of the feeding cycle.

On its face opposite the cam-groove 158, the cam 159 is provided with a second cam-groove 160, in which works a roller 161 carried by a lever 162 suitably mounted and fixed at its rearward end intermediately on a shaft 163 journalled in and between suitable brackets 164 upstanding from the frame 1. At each end of the shaft 163, is mounted a lever 165 provided at its forward end with a slot 166, in which works a pin 167' carried by the adjacent one of a pair of opposing legs 168' depending from the gate 23a. It will be seen that, on rotation of the face-cam 159, its cam-groove 158 effects oscillation of the lever 40a, which movement is transmitted, in turn, to its paired lever 40' by means of the shaft 41 on which said levers 40a and 40' are mounted, substantially as hereinbefore described for the levers 40, 40'. And, at the same time, the cam-groove 160 effects through the roller 161, oscillation of the shaft 163 levers 165 in synchronism with, and during a predetermined portion of, the movement of the levers 40a, 40'. For such purpose, the cam-groove 160 is provided with a falling portion m for dropping the gate 23a for admitting its impinging loaf onto the bed of rollers 28 for advancement with the push-plate 36 across the plate 26. Then the cam groove 160 is concentric with the shaft 47' for retaining the gate 23a in lowered position until the push-plate 36 is near the end of its feed stroke, when a rising portion p of the cam-groove 160 carried the gate 23a to rise to loaf-obstructing position, in which position the gate 23a is held by means of a concentric portion r of the cam-groove 160, in readiness for repetition of the cycle as described. With the exceptions noted, the feeding mechanism B' is in form, construction, and functions similar to the feeding mechanism B hereinbefore described, and hence further description thereof is omitted.

In the modified form of slicing mechanism C'' of Figure 12, the compression plungers 82 of the mechanism C are omitted, and in their place is substituted a construction, now to be described, for positively actuating the upper pair of tensioning bars 76, 76a, in unison with the lower pair of actuating bars 101, 95, respectively, while maintaining a suitable individual and group tension on the knives 67.

For such purpose, a pair of opposing rearwardly projecting arms 167 is mounted on, and for oscillation with, a shaft 75a, on which is mounted, for oscillation thereof, the arms 74a supporting the tensioning bar 76. Adjustable rods 168, each including a suitable sleeve-nut turn-buckle or the like, 169, are pivoted at their upper ends to the respective arms 167, and at their lower ends to the respective pivot pins 170 connecting the links 98 and arms 99. Hence the bars 76 and 101 oscillate in unison for corresponding movement of the knives 67 associated therewith, the tension of said knives being suitably varied by manipulation of the sleeve-nuts 169, as will be understood. And for like purpose adjustable rods 171, each including a suitable sleeve-nut or the like 169, are pivoted at their upper ends to the respective arms 74b carrying the tensioning bar 76a, and at their lower ends to respective lugs 172 upstanding from the respective levers 96 supporting the actuating bar 95. And hence the bars 76a and 95 will likewise oscillate in unison for corresponding movement of the knives 67 associated therewith, said knives 67 being tensioned by suitable manipulation of the sleeve-nuts 169.

An actuating shaft 92a is journalled in and between the standards 60a near the base thereof and carried, respectively mounted adjacent its opposite ends, a pair of eccentrics 173, each co-operating with an eccentric-strap 174 pivotally connected, as at 175, to the adjacent one of the levers 96 supporting the bar 95, the link 98 operatively connecting the levers 96 with the levers 99 supporting the bar 101, as hereinbefore described.

The eccentrics 173 and straps 174 establish a positive reciprocatory drive to the levers 96, 99, and hence, in the present instance, the spring 102 shown in Figure 3 is here unnecessary and omitted. With the exceptions noted, the slicing mechanism C'' is in form, construction and function similar to the slicing mechanism C, and hence a further description thereof is also here omitted. In the operating mechanism D'' shown in Figure 12, the motor 118 drives said jack-shaft 120' and also the shaft 92a, substantially as hereinbefore described for the shaft 92. And the shaft 120' carries the sprocket 122, which, by means of the chain 123, drives the sprocket 124 mounted on the shaft 125. The transmission device 126 and longitudinal shaft 127 and associated mechanisms before described for the mechanism D are in the present case omitted as unnecessary due to the described head-pulley drive of the belt 7. The shaft 125 carried the pinion 130 meshing with a gear 46a mounted on the shaft 47' carrying the cam 159. And the shaft 47' also carries a sprocket 176 over which is trained a chain 177, which successively is also trained over a sprocket 178 on the shaft 154 for actuation of the conveyer 7 and over a sprocket 179 on the shaft 31 for actuation of the bed of rollers 28.

In use and operation, the loaves of bread or other commodity to be sliced are deposited on the belt 7 and are thereby crowded between the guide-bars 19, 20 against the gate 23, which, being periodically lowered, admits a loaf at a time to the feeding-plate 26, from which the successive loaves are fed to and through the slicing knives 67, 68, by the push-plate 36. The successively sliced loaves are deposited on the delivery table 116, from which they may be removed as desired for wrapping or packaging purposes.

The cooperation of the several instrumentalities of the machine having been fully pointed out as the description has proceeded, it will be seen that the machine successfully accomplishes its purposes in a highly efficient and practical manner, some of the particular features and advantages of the machine being the intermittent feed of the loaves to the cutting mechanism which especially, though not exclusively, adapts the machine for use in connection with bread-wrapping machines or the like, the positive feeding action of the push-plate 36, which insures the steady and uniform movement of the loaves to and through the cutting knives, substantially avoiding so-called "pilling" or "balling-up" of the tissues of the loaf, the unique method of automatically compensating for unavoidable variations in the manufacture of the knives, which provides for a uniform tension therein and thus, by avoiding flexing and breakage, prolongs the useful life of each knife, and the light weight of the reciprocating elements by the elimination of heavy knife frames and the like, which permits the use of relatively high cutting speeds of the knives, whereby the period of reversal of stroke of each knife, when the cutting action is practically nil, is of such short duration as to have a negligible or no retarding effect on the movement of the loaf being sliced, by reason of which fact, the capacity of the machine is increased, that is to say, the loaves may be fed through the slicing knives at a faster rate than would be obtained with a slow speed, long stroke knife.

And, while, as I have stated, my machine is especially adapted for the slicing of bread loaves, the machine may efficiently be employed in and for the slicing of other sliceable commodities, and it is also to be understood that changes and other modifications in the form, construction, arrangement, and combination of the several parts of the machine may be made and substituted for those herein shown and described without departing from the nature and principle of my invention.

Having thus described my invention, what I claim and desire to secure by Letters Patent is:

1. A slicing machine comprising, in combination, slicing means, means for successively feeding the articles to be sliced to the slicing means, and mechanism for intermittently loading the feeding means with the successive articles to be sliced, said loading mechanism including a first article conveyer, a supplemental article conveyer aligned with the first conveyer, and means for intermittently arresting movement of the articles from the first conveyer to the supplemental conveyer.

2. A slicing machine comprising, in combination, slicing means, means for successively feeding the articles to be sliced to the slicing means, and mechanism for intermittently loading the feeding means with the successive articles to be sliced, said loading mechanism including first conveyer, a supplemental article conveyer, a member shiftable into and out of the path of the articles being conveyed by the first conveyer, and means for actuating said member for intermittently arresting movement of the conveyed articles from the first conveyer to the supplemental conveyer.

3. A slicing machine comprising, in combination, slicing means, means for successively feeding the articles to be sliced to the slicing means, and mechanism for intermittently loading the feeding means with the successive articles to be sliced, said loading mechanism including first conveyer, a supplemental article conveyer, a gate shiftable intermediate said conveyers into and out of the path of the articles being conveyed by the first conveyer, and means for shiftably actuating the gate for intermittently arresting movement of the conveyed articles from the first conveyer to the supplemental conveyer.

4. A slicing machine comprising, in combination, slicing means, means for successively feeding the articles to be sliced to the slicing means, and mechanism for intermittently loading the feeding means with the successive articles to be sliced, said loading mechanism including an endless conveyer-belt, a supplemental conveyer comprising a group of rollers, a gate shiftable intermediate the conveyer and rollers into and out of the path of the articles being conveyed by the conveyer, and means for shiftably actuating the gate for intermittently arresting movement of the conveyed articles from the conveyer to the rollers.

5. A slicing machine comprising, in combination, slicing means, means for successively feeding the articles to be sliced to the slicing means, and mechanism for intermittently loading the feeding means with the successive articles to be sliced, said loading mechanism including an endless conveyer-belt, a supplemental conveyer comprising a group of rollers, a gate shiftable intermediate the conveyer and rollers into and out of the path of the articles being conveyed by the conveyer, means for shiftably actuating the gate for intermittently arresting movement of the conveyed articles from the conveyer to the rollers, and means for rotatably actuating the rollers.

6. A slicing machine comprising, in combination, slicing means, and mechanism for successively feeding articles to be sliced to and through the slicing means, said feeding mechanism including an article receptive feed-plate, a feeding-member adapted to periodically traverse said feed-plate, means including article engaging rollers adapted to successively dispose the articles to be sliced on the feed-plate for engagement by the feeding member, and means for actuating the feeding-member.

7. A slicing machine including a frame, spaced fulcrum-bars supported on the frame, a plurality of groups of levers in pair relation fulcrumed intermediate their ends on said bars for oscillation, each lever including a long and a short arm, corresponding groups of cutting knives supported by and at the free end of the long arms of said levers, and means engageable with the short arms of the levers for rocking the groups of levers for lengthwise oppositely reciprocating the groups of knives.

8. A slicing machine including a frame, spaced fulcrum-bars supported on the frame, a plurality of groups of levers fulcrumed intermediate their ends on said bars for oscillation, each lever including a long and a short arm, means engaging the bars and levers for spacing the levers in operative pair relation on the bars, corresponding groups of cutting knives supported by and at the free end of the long arms of said levers, and means engageable with the short arms of the levers for rocking the groups of levers for lengthwise oppositely reciprocating the groups of knives.

9. A slicing machine comprising, in combination, slicing means, a feed-plate for the slicing means, a feeding member adapted to periodically traverse said feed plate, an article-conveyer disposed in the plane of the feed-plate, means including a shiftable gate for admitting articles to be sliced one at a time from the conveyer to said feed plate, a lever swingable for actuating said feeding member, a second lever swingable for actuating said gate, and means carried by said first lever for actuating said second lever.

10. In a slicing machine, slicing means including a plurality of knife supporting members, a bar disposed transversely to said knife supporting members, and a plurality of yieldable members carried by the bar for respectively engaging said knife supporting members.

11. In a slicing machine, slicing means including a plurality of knife supporting members, a bar disposed transversely to said knife supporting members, a plurality of members respectively yieldably engaging said knife supporting members, and means for resiliently supporting said yieldable members on the bar.

12. In a slicing machine, in combination, slicing means, and means for engaging an article fed to and through the slicing means, said means including a support, a pair of levers mounted for oscillation on the support, an arm swingable on each of said levers, a member carried by said arms for engaging the article, devices yieldably connecting each lever with its carried arm, and devices yieldably connecting each lever with said support.

13. In a slicing machine, in combination, slicing means, and means for engaging an article fed to and through the slicing means, said means including a support, a pair of levers oscillable on the support, an arm swingable on each of said levers, a pair of article-engaging members respectively carried between said arms in front and in rear of said slicing means, devices yieldably connecting each lever with its carried arm, and devices yieldably connecting each lever with said support.

14. In a slicing machine, slicing means including a plurality of knife supporting members, a tensioning member disposed transversely to said knife supporting members, yieldable means including a plurality of resiliently supported members carried by said tensioning member for engaging said knife supporting members, a support, and means carried by said support for yieldably engaging said tensioning member.

15. In a slicing machine, slicing mechanism comprising, in combination, a plurality of slicing-knives, means comprising a plurality of oscillatory members arranged in pairs for supporting the respective knives, and means for connecting the respective pairs of members for tensioning their carried knives.

16. In a slicing machine, slicing mechanism comprising, in combination, a plurality of slicing-knives, means comprising a plurality of oscillatory members arranged in opposing groups for supporting the respective knives, means including a member having engagement with all of the respective members of one group for tensioning said knives, means including a member having engagement with all of the respective members of the other group for actuating the knives, and means for adjustably connecting said tensioning member with said reciprocating member.

17. In a slicing machine, slicing mechanism comprising, in combination, a plurality of slicing-knives, means comprising a plurality of oscillatory members for supporting the respective knives, means for connecting the respective oscillating members for tensioning said knives, and means for actuating the oscillatory members in unison for reciprocating the knives.

18. A slicing machine comprising, in combination, slicing means, a feed-plate for the slicing-means, a feeding member adapted to periodically traverse said feed plate, a conveyer disposed in the plane of the feed-plate, a shiftable gate for admitting the articles to be sliced one at a time from the conveyer to said feed-plate, operating means for the feeding member, and means actuable by said operating means for shifting said gate.

19. In a slicing machine, slicing means comprising a plurality of groups of transversely spaced banks of levers arranged in vertically aligned opposing pairs, a plurality of cutting knives each supported by one of said pairs of levers, and means including members disposed transversely of and engaging all the levers in a particular bank for oscillating the groups of pairs of levers in opposite directions.

20. A slicing machine comprising, in combination, slicing means, and mechanism for successively feeding articles to be sliced to the slicing means, said feeding mechanism including a feed-plate, a first conveyer for feeding articles in an abutting series, means including a group of driven rollers for receiving the articles from the first conveyer and delivering the same successively in non-abutting relation on the feed-plate, and a member for periodically traversing the feed-plate for feedingly engaging the respective articles.

21. A slicing machine comprising, in combination, slicing means, and mechanism for successively feeding articles to be sliced to the slicing means, said feeding mechanism including a feed-plate, a first conveyer for feeding articles in an abutting series, means including a group of driven rollers for receiving the articles from the first conveyer and delivering the same successively in non-abutting relation on the feed-plate, and a member movable from, toward, and traversingly over the feed-plate for feedingly engaging the respective articles.

22. In a slicing machine, slicing mechanism including a plurality of cutting knives, a plurality of swingable levers disposed in opposing groups for supporting the knives, and means including operatively connected bars for swingably actuating the levers for reciprocating the knives.

23. A slicing machine including a plurality of cutting knives, in combination with a plurality of oscillatory levers arranged in opposing series, transverse members for oscillating the series of levers for reciprocating the knives, and means yieldingly interposed between one of the transverse members and the individual levers for tensioning the knives.

24. A slicing machine comprising, in combination, slicing means, a feed-plate, and means for disposing the articles to be sliced on the feed-plate, said depositing means including a conveyer, a group of rollers disposed adjacent an end of the conveyer, a shiftable gate for controlling discharge of the articles from the conveyer to the rollers, means for actuating the conveyer, and means for actuating the rollers at a higher peripheral speed than the linear speed of the conveyer for moving a discharged article from the path of the gate.

25. In a slicing machine, slicing means including a plurality of knife-supporting levers, a shiftable bar extending transversely of the levers, yielding members supported by the bar for engagement with the levers, and means for biasing the bar toward the levers.

26. A slicing machine comprising, in combination, a feed-plate, slicing knives reciprocatory through the slot of the feed-plate, a first conveyer for feeding the articles to be sliced in an abutting series, a second conveyer longitudinally aligned with the first conveyer for receiving the articles therefrom for spacing the same successively one from the other, and means including a push-plate periodically movable in a path extending obliquely from, at right angles toward, and traversingly over the feed-plate for engaging the respective articles for feeding the same to the slicing means.

27. A slicing machine comprising, in combination, a slotted feed-plate, slicing knives reciprocatory through the slot of the feed-plate, spaced frames having registering successively connected cam-grooves comprising portions respectively disposed horizontally over and obliquely and at right angles to the feed-plate, a feeding push-plate having portions fitting for movement in said grooves, and means including a vibratory lever and a link having connection with the push-plate for actuating the same sequentially in the path defined by said grooves.

28. A slicing machine comprising, in combination, a slotted feed-plate, slicing knives reciprocatory through the slot of the feed-plate, spaced frames having registering successively connected cam-grooves comprising portions respectively disposed horizontally over and obliquely and at right angles to the feed-plate, a feeding push-plate having portions fitting for movement in said grooves, said push-plate being provided with series of spaced tongues for interfitting the knives, and means including a vibratory lever and a link having connection with the push-plate for actuating the same sequentially in the path defined by said grooves, the link being angularly disposed with relation to the respective cam-grooves at opposite termini of movement of the lever for urging the feeding-member to follow the cam-grooves in the stated sequence.

EDWARD J. SCHNEIDER.